United States Patent [19]
Donovan

[11] Patent Number: 5,755,458
[45] Date of Patent: May 26, 1998

[54] SLIDE-IN AND SNAP-FIT AIR BAG MOUNTING ARRANGEMENT

[75] Inventor: Steven P. Donovan, Roscoe, Ill.

[73] Assignee: Textron Inc., Providence, R.I.

[21] Appl. No.: 831,246

[22] Filed: Apr. 2, 1997

Related U.U. Application Data

[60] Provisional application No. 60/030,457 Dec. 11, 1996

[51] Int. Cl.$^6$ .................................................. B60R 21/16
[52] U.S. Cl. ..................................... 280/728.2; 280/728.1; 280/731
[58] Field of Search ........................... 280/728.2, 731, 280/728.1, 732

[56] References Cited

U.S. PATENT DOCUMENTS

| | | | |
|---|---|---|---|
| 4,785,144 | 11/1988 | Fosnaugh et al. | 200/61.55 |
| 5,149,127 | 9/1992 | Manabe et al. | 280/731 |
| 5,176,400 | 1/1993 | McGuire et al. | 280/728.1 |
| 5,333,897 | 8/1994 | Landis et al. | 280/728.2 |
| 5,383,682 | 1/1995 | Nagata et al. | 280/728.2 |
| 5,409,256 | 4/1995 | Gordon et al. | 280/728.2 |
| 5,588,666 | 12/1996 | Namata | 280/728.2 |
| 5,593,178 | 1/1997 | Shiga et al. | 280/731 |
| 5,599,039 | 2/1997 | Goss et al. | 280/728.2 |
| 5,603,524 | 2/1997 | Barnes et al. | 280/728.2 |
| 5,636,858 | 6/1997 | Niederman et al. | 280/728.2 |

FOREIGN PATENT DOCUMENTS

| | | | |
|---|---|---|---|
| 2270882 | 3/1994 | United Kingdom | 280/728.2 |

*Primary Examiner*—Christopher P. Ellis
*Attorney, Agent, or Firm*—Trexler, Bushnell, Giangiorgi & Blackstone, Ltd.

[57] ABSTRACT

A novel system and method are presented for slide-fitting an air bag module with a steering wheel hub by a snap-fit connection to quickly and easily assemble the components together. One of the components has fastener members releasably attached thereto and the other has holding members, which may be formed of U-shaped clip members or extensions, on opposite sides thereof, which fastener members and holding members are joined together to secure the air bag module to the steering wheel hub. Each holding member has a resilient portion which can be deflected and a double-radiused aperture therein for respectively engaging a pilot end on the fastener members when the air bag module is engaged with the steering wheel hub. Resilient mounting members are provided on one of the components. The resilient mounting members compress during attachment of the air bag module to the steering wheel hub and relax after initial engagement of the fastener members with the holding members to move the pilot end points of the fastener members into the smaller radiused portion of the double radiused aperture in the respective holding members to secure the engagement of the fastener members to the holding members, and correspondingly mount the air bag module to the steering wheel hub. The air bag module can be easily and quickly disassembled from the steering wheel hub by a qualified technician with the proper tool for service or replacement.

33 Claims, 9 Drawing Sheets

SLIDE-IN AND SNAP-FIT AIR BAG MOUNTING ARRANGEMENT

This application claims the priority of provisional patent application Ser. No. 60/030,457 filed Dec. 11, 1996.

BACKGROUND OF THE INVENTION

This invention is generally directed to an air bag module that slides and snaps into place on a steering wheel hub for easy and quick assembly of the components and which can be easily removed by a qualified technician for replacement or service. More specifically, the present invention has a pair of holding members, such as a pair of clip members or a pair of extensions, each is holding member providing a double-radiused aperture and being mounted oil one of the air bag module or the steering wheel hub, and each of which is engaged in a novel snap-fit manner by a fastener member releasably mounted on the other of the air bag module or the steering wheel hub. The fastener members are respectively engaged with the holding members by pushing the air bag module against the steering wheel hub so that the fastener members slide along and resiliently deflect the holding members and engage the double radiused aperture provided through the holding members when the holding members snap back into place to secure the air bag module to the steering wheel hub.

In current air bag module designs, the air bag module is loosely mounted to or placed upon the steering wheel hub and thereafter, the fastener members are inserted through respective side apertures and engaged with respective clips provided on the steering wheel hub and a tab provided on the air bag module, with the fastener members being screwed into place to interconnect the air bag module to the steering wheel hub. This method of assembly is time consuming and not ergonomical in that the fastener members must be precisely placed through the clips and the tabs and carefully screwed into place to ensure that the air bag module is properly secured to the steering wheel hub.

The present invention provides a novel solution to this assembly problem by providing an air bag module which slides in to place with a snap-fit action and engages the steering wheel hub by an installer simply pushing the air bag module towards the steering wheel hub. The snap-fit connection provides an audible click for providing an active indication that proper assembly has been attained. Other features and advantages will become apparent upon a reading of the attached specification when taken in conjunction with a study of the drawings.

OBJECTS AND SUMMARY OF THE INVENTION

An object of the present invention is to provide a novel system for securing an air bag module to a steering wheel hub.

Another object of the present invention is to provide a novel system for easily and quickly installing an air bag module to a steering wheel hub by using a novel slide-in and snap-fit assembly.

Yet another object of the present invention is to provide a novel system for easily and quickly removing an air bag module from a steering wheel hub by a qualified technician for replacement or service.

Briefly, and in accordance with the foregoing, the present invention discloses a novel system for slide in and snap fitting an air bag module with a steering wheel hub to quickly and easily assemble the components together. The components can also be easily and quickly disassembled by a qualified technician for replacement or service.

In the first through sixth embodiments shown in the drawings, the air bag module has a pair of fastener members attached thereto and the steering wheel hub has a pair of U-shaped holding members, which are provided by clip members, on opposite sides thereof. The clip members and the fastener members are engaged with a snap-fit to secure the air bag module to the steering wheel hub.

The air bag module has a pan tab for releasably engaging the respective fastener members therewith. A clinch nut having a counterbore therein in which the head of the fastener is seated may be provided on the pan tab to resist tampering with the fastener member. Alternatively, as shown in the second embodiment, each pan tab can be provided with an extrusion having a threaded aperture to which the fastener member is removably engaged.

Each fastener member includes a head, a threaded shank portion and a pilot point having a bulbous, somewhat spherical end portion which is separated from the shank portion by an annular retention groove. The end portion has a diameter which is greater than the diameter of the retention groove and the shank portion has a diameter which is greater than the diameter of the retention groove. Alternatively, a cone shaped portion having a diameter greater than the diameter of the retention groove may be provided on the end of the fastener member instead of the bulbous end portion.

Each clip member includes a pair of legs depending from a base, one of the legs being resiliently deflectable to permit engagement of the respective fastener member with the respective clip member. The resiliently deflectable leg of each clip member has a double-radiused aperture therein for respectively engaging the fastener members when the air bag module is engaged with the steering wheel hub. The double radiused aperture has a smaller radiused portion and a larger radiused portion. The pilot point of each fastener member is respectively inserted through the larger radiused portion until the retention groove sits in the aperture. The fastener member then moves upwardly into the smaller radiused portion by sliding along the retention groove to secure the fastener member to the clip member. The resiliently deflectable leg of each clip member also has an indentation thereon for engagement with the fastener member to guide the fastener member into the double radiused aperture.

Resilient mounting members are provided on the steering wheel hub. The resilient mounting members compress during attachment of the air bag module as it is being pressed downwardly onto the steering wheel hub and relax after downward pressure on the air bag module is stopped. The resilient mounting members do not completely return to their original, completely uncompressed state after downward pressure has been stopped and instead are maintained with some compression in order to prevent rattle of the air bag module.

Once the pilot point of the fastener members passes through the larger radiused portion of the aperture in the clip member, the deflected leg of the clip member snaps back against the steering wheel hub. When the resilient mounting members relax, the air bag module with the fastener members carried thereon are also moved upwardly to move the retention groove of the fastener member into the smaller radiused portion of the double radiused aperture to secure the fastener members to the clip members as the pilot point cannot be withdrawn through the smaller radiused portion of the double radiused aperture. The net result is the mounting the air bag module to the steering wheel hub, with a sliding action and snap-fit-type of assembly.

If the need arises, the air bag module can be easily and quickly removed by a qualified technician for replacement or service. To remove the air bag module, each fastener member is removed through access apertures provided through the sides of the steering wheel hub adjacent to the clip members. Each fastener member is unscrewed with the proper tools by a qualified technician to cause them to move through the respective pan tabs and the clinch nuts. The bulbous profile of the pilot point causes it to cam downwardly into the larger radiused aperture when it comes into contact with the clip member so that the fastener member can be released therefrom. Once the fastener members are removed from the respective clinch nuts, the air bag module is free to be released from the steering wheel hub by pulling it away from the hub. The fastener members can then be reassembled with the air bag module pan tabs for reinstallation of the air bag module with the steering wheel hub by a sliding, snap-fit engagement.

As shown in the third embodiment, if desired, both the pan tab and the clip member can flex during assembly, with both the pan tab and the clip member snapping toward each other once the fastener pilot end portion has passed through the larger radiused portion of the aperture. As shown in the fourth embodiment, the fastener members can be placed at an angle other than 90° to the installation plane relative to the clinch nuts. By placing the fastener members at an angle relative to the installation plane, this allows for easier access to the fastener members for subsequent disassembly.

In the fifth and sixth embodiments of the assembly, an elastomeric member is associated with each clinch nut. Each elastomeric member compresses between the clinch nut and the clip member as the fastener member is initially engaged with the double radiused aperture in the clip member. Once the air bag module moves upwardly relative to the steering wheel hub as the fastener members move into the smaller radiused portion of the aperture and the resilient mounting members relax after downward pressure on the air bag module is stopped, the elastomeric members associated with the clip members do not completely return to their original, completely uncompressed state after downward pressure has been stopped and instead are maintained with some compression in order to further prevent rattle of the air bag module.

In the seventh embodiment, the separate clip members have been eliminated and each have been replaced by a holding member in the form of an extension provided on the steering wheel casting. The indentation and the double radiused aperture are provided on each extension. The pan tab to which the fastener member is mounted is flexible such that it can flex outwardly to allow the pilot point of the fastener member to slide along the indentation and engage the double radiused aperture. As the pilot point of the fastener member passes through the larger radiused portion of the aperture, the pan tab flexes inwardly to snap the air bag module into place with the steering wheel hub.

In the eighth embodiment, each fastener member is placed on an extension provided on the steering wheel casting instead of on the air bag module. The air bag module has a pair of pan tabs, which form the holding members, and each of which has the indentation and the double radiused aperture thereon for engagement with the respective fastener member. Each pan tab is flexible so that it can flex inwardly toward the center of the air bag module to allow the pilot point of the respective fastener member to slide along the indentation and engage the double radiused aperture. As the pilot point of the fastener member passes through the larger radiused portion of the aperture, the pan tab flexes outwardly to snap the air bag module into place.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 8:
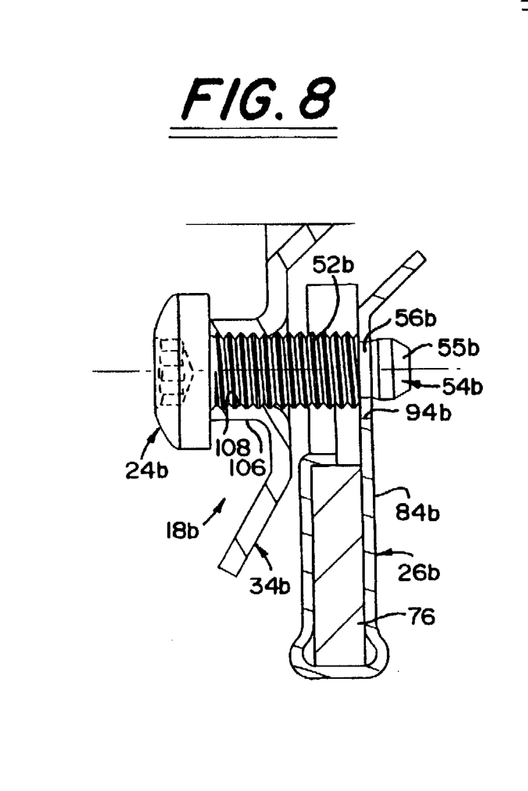
FIG. 8 is a cross-sectional view of the components, with the fastener member shown in a side elevational view, which incorporate the features of a second embodiment of the present invention and shown fully assembled.
Figure 9:
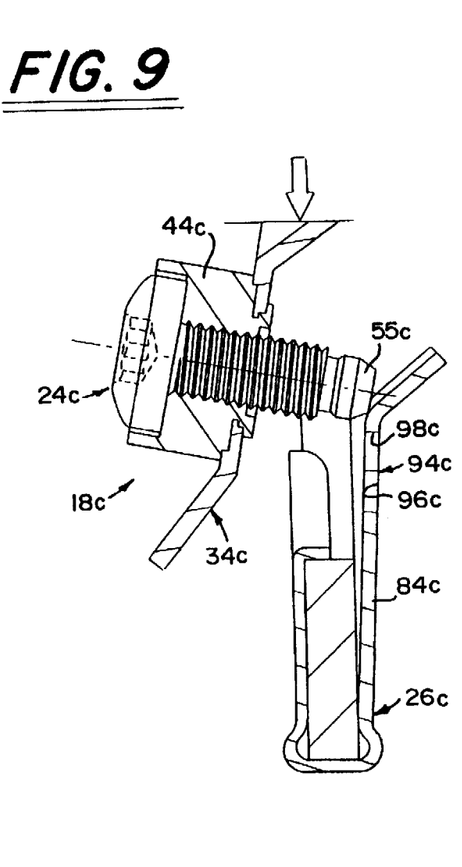
FIG. 9 is cross-sectional view of the components, with the fastener member shown in a side elevational view, which incorporate the features of a third embodiment of the present invention and shown partially assembled.
Figure 10:
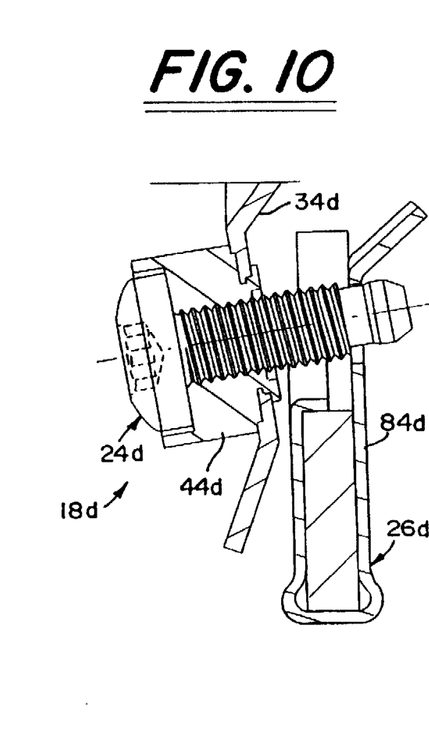
FIG. 10 is a cross-sectional view of the components, with the fastener member shown in a side elevational view, which incorporate the features of a fourth embodiment of the present invention and shown fully assembled.
Figure 15:
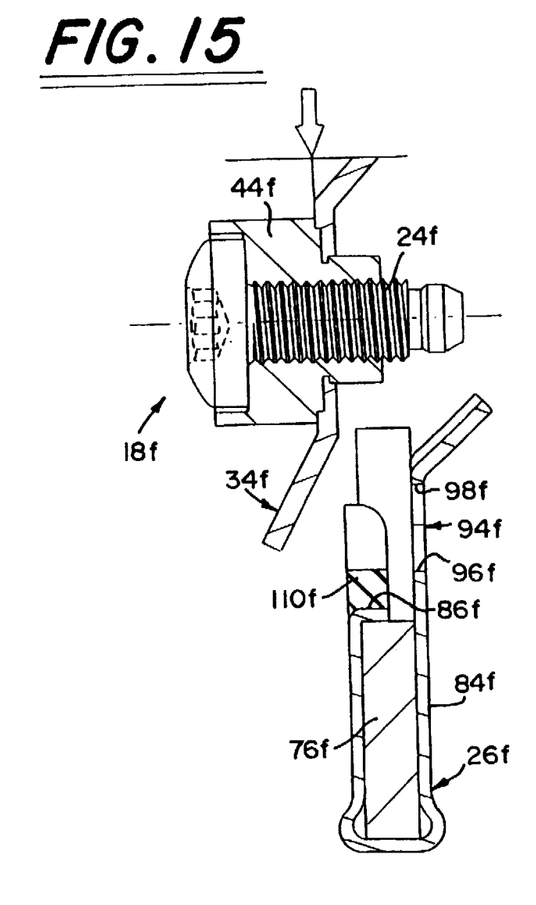
FIG. 15 is a cross-sectional view of the components, with the fastener member shown in a side elevational view, which incorporate the features of a sixth embodiment of the present invention and shown prior to assembly.
Figure 16:
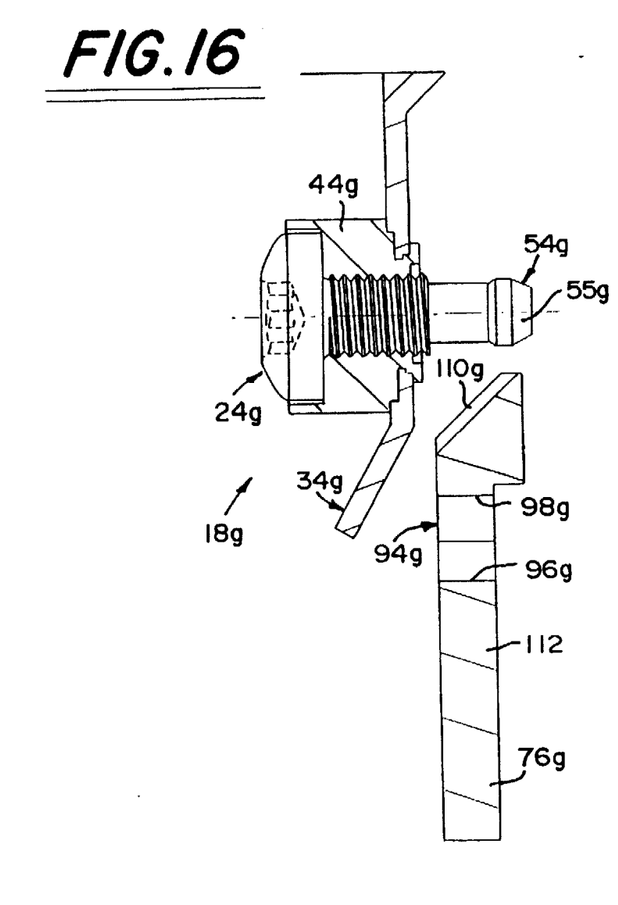
FIGS. 16-18 are cross-sectional views of the components, with the fastener member shown in a side elevational view, which incorporate the features of a seventh embodiment of the present invention and illustrating the sequence of operation in joining the air bag module with the steering wheel hub using the novel slide-in and snap-fit assembly of the present invention.
Figure 17:
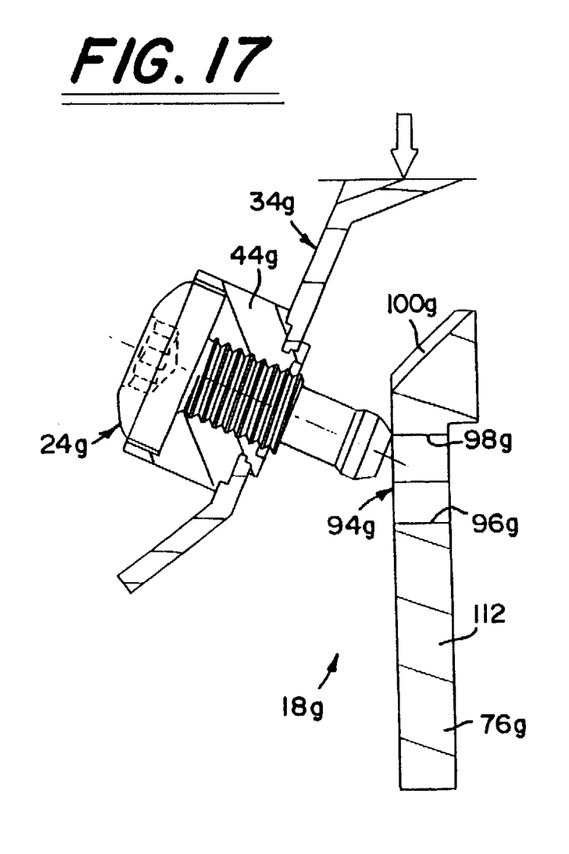
Figure 18:
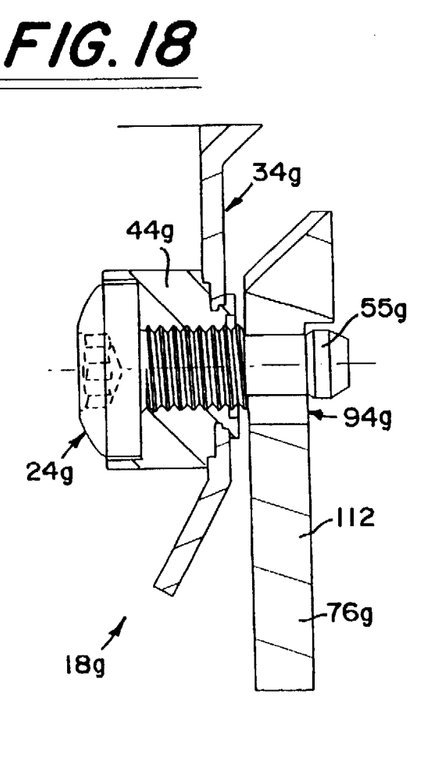
Figure 19:
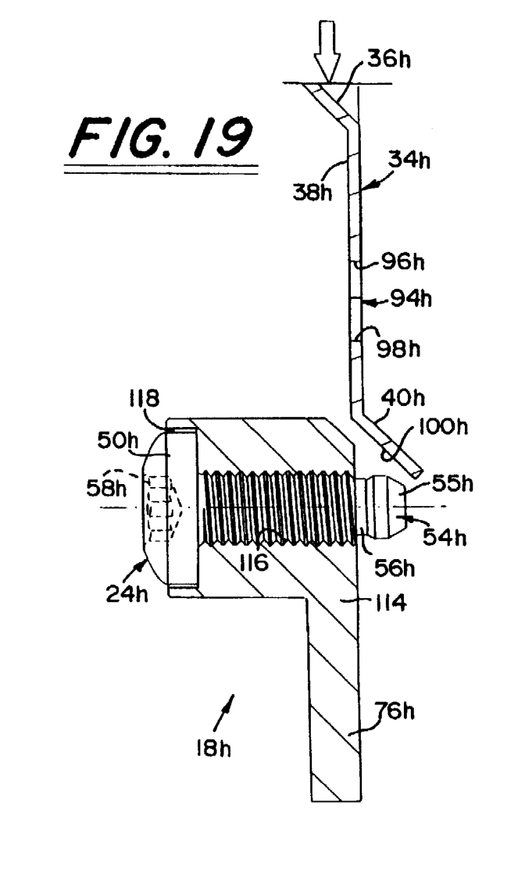
FIGS. 19-21 are cross-sectional views of the components, with the fastener member shown in a side elevational view, which incorporate the features of a eighth embodiment of the present invention and illustrating the sequence of operation in joining the air bag module with the steering wheel hub using the novel slide-in and snap-fit assembly of the present invention.
Figure 20:
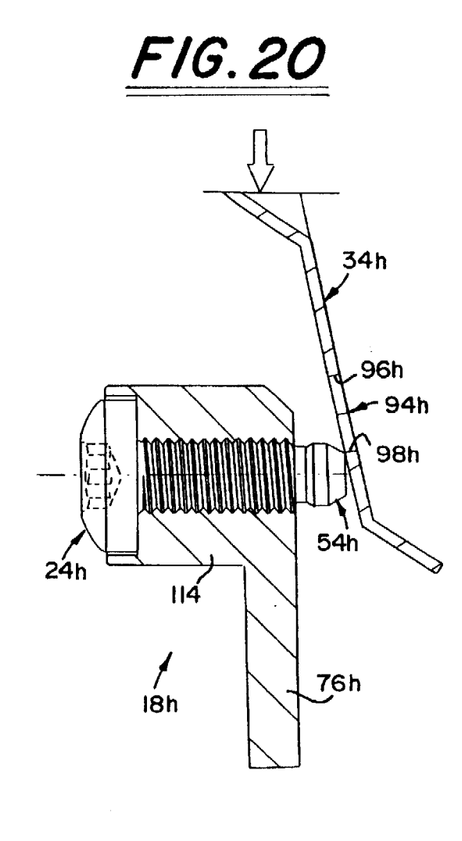
Figure 21:
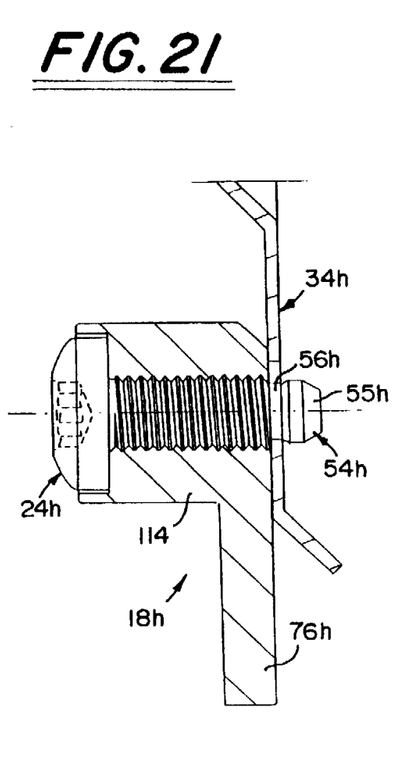

The present invention provides a novel system 18 for mounting an air bag module 20 onto a steering wheel hub 22, with a sliding, snap-fit mounting. A first embodiment of the novel system 18 is shown in FIGS. 1–7. A second embodiment of the system 18b is shown in FIG. 8; a third embodiment of the system 18c is shown in FIG. 9; a fourth embodiment of the system 18d is shown in FIG. 10; a fifth embodiment of the system 18e is shown in FIGS. 11–14; a sixth embodiment of the system 18f is shown in FIG. 15; a seventh embodiment of the system 18g is shown in FIGS. 16–18; and a eighth embodiment of the system 18h is shown in FIGS. 19–21. Like elements in each embodiment are denoted with like reference numerals, with the second embodiment having the suffix "b" after the reference numeral; the third embodiment having the suffix "c" after the reference numeral; the fourth embodiment having the suffix "d" after the reference numeral; the fifth embodiment having the suffix "e" after the reference numeral; the sixth embodiment having the suffix "f" after the reference numeral; the seventh embodiment having the suffix "g" after the reference numeral; and the eighth embodiment having the suffix "h" after the reference numeral.

First, the specifics of the first embodiment of the system 18 are described, along with its operation. Thereafter, the specifics of the second through eighth embodiments is described. Each of the second through eighth embodiments is identical to, provides the same functions as, and functions in an identical manner, to that of the first embodiment, except for the differences discussed herein.

Attention is now directed to FIGS. 1–7 which shows the system 18 which incorporates the features of the first embodiment of the invention. The air bag module is provided with a pair of novel fastener members 24 releasably attached thereto and the steering wheel hub 22 is provided with a pair of novel U-shaped holding members 26, each of which is formed from a spring clip member 26. The fastener members 24 on the air bag module 20 slide in and securely engage the U-shaped clip members 26 on the steering wheel hub 22 with a snap-fit action to secure the air bag module 20 to the steering wheel hub 22. The air bag module 20 can thereafter be released from the steering wheel hub 22 by a qualified technician when needed for service or replacement, as described herein.

The air bag module 20 includes a plastic cover 28 having a metal air bag support plate 30 attached thereto by suitable means with a conventional, inflatable air bag and inflator sandwiched therebetween, the air bag and inflator being generally designated at 32. The air bag support plate 30 has a pair of pan tabs 34 fabricated thereon and disposed on opposite sides thereof. As shown in FIGS. 2–8, each pan tab 34 has a first portion 36 which is angled relative to the plate 30, a second portion 38 which is generally perpendicular relative to the plate 30 and angled relative to the first portion 36, and a third portion 40 which is angled relative to the second portion 38. The first and third portions 36, 40 are angled outwardly away from the center of the air bag module 20. The second portion 38 of each pan tab 34 has an aperture 42 therethrough so that an internally threaded clinch nut member 44, to be described in detail herein, can be engaged in the aperture 42.

The internally threaded clinch nut member 44 is staked to the second portion 38 in aperture 42 of each pan tab 34 by a suitable staking operation on the side of the second portion 38 which is away from the center of the air bag module 20. The clinch nut member 44 includes a threaded bore 46 therethrough and a counterbore 48 at one end thereof in which the head 50 of the fastener member 24 is seated. Preferably, the clinch nut member 44 is a STRUX® clinch nut which has been fabricated to provide the counterbore 48.

Each fastener member 24 used with the present invention is a special screw having a head 50, a threaded shank portion 52 depending from the head 50 which provides a machine screw thread and a pilot point 54 having a bulbous, somewhat spherical end portion 55 at the end of the threaded shank portion 52 and separated therefrom by a smooth, annular retention groove 56. A tamper resistant drive recess 58, such as a multi-lobular recess, is provided in the head 50 of the fastener member 24 and is preferably a tamper resistant TORX PLUS® recess. The end portion 55 of the pilot point 54 has a diameter which is greater than the diameter of the pilot point retention groove 56, and the shank portion 52 has a diameter which is greater than the retention groove 56. Alternatively, it is envisioned that the end portion 55 of the pilot point 54 can be replaced by pilot points of varying shape, such as by a cone shaped pilot point which has a diameter that is greater than the retention groove 56.

The steering wheel hub 22 includes a hand grip portion 60, a plastic steering wheel housing 62 and a metal base 64. The steering wheel housing 62 provides a recess in which the base 64 sits generally at the bottom thereof. The hand grip portion 60 is provided with four inwardly extending portions 66, 66', 66", 66''' that join with the steering wheel housing 62 by snap-fit means. A pair of resilient mounting members 68, which are formed from resilient material, are provided on the hand grip portion 60 proximate to the inwardly extending portions 66', 66" and protrude into the recess provided by housing 62 at the top thereof. More than a pair of resilient mounting members may be provided. The metal base 64 is non-movably seated in the steering wheel housing recess at the bottom thereof and attached thereto by screws 70. The opposite end of the metal base 64 is attached to the resilient mounting members 68 by legs 72. The base 64 includes an intermediate portion 74 and side casting portions 76 which extend perpendicularly to the intermediate portion 74. Each side casting portion 76 has a concave shaped cutout 78 therein. As such, the steering wheel hub 22 includes a generally central portion to which the air bag module 20 is to be received and retained in the mounted relationship.

Each of the clip members 26 is respectively attached to one of the side casting portions 76 of the base 64 at the position of the concave shaped cutout 78 as shown in FIGS. 1 and 3–7. Each clip member 26 is formed of resilient metal and is generally U-shaped. As best shown in FIG. 2, each U-shaped clip member 26 includes a base 80 and first and second legs 82, 84 which depend from the base 80. The first leg 82 is generally planar and is shorter than the second leg 84. A U-shaped cutout 86 is provided at the top of the first leg 82 and has a U-shaped retention tab 88 thereon which protrudes inwardly towards the second leg 84. The second leg 84 has a planar portion 90 proximate to the base 80 and an angled guide portion 92 which is angled outwardly relative to the planar portion 90 and relative to the planar first leg 82.

A double radiused aperture 94 is provided through the planar portion 90 of the second leg 84 for accepting the pilot point 54 of the respective fastener member 24 and for retaining the fastener member 24 when the air bag module 20 is properly installed with the steering wheel hub 22. The double radiused aperture 94 aligns with the U-shaped cutout 86 at the top of the first leg 82 and is provided by a first portion 96 having a larger diameter relative to a second portion 98 which has a smaller diameter. The first, larger radiused portion 96 of the aperture 94 is provided below the second, smaller radiused portion 98. That is to say, the first portion 96 of the aperture 94 is closer to the base 80 of the clip member 26 than the second portion 98 of the aperture 94. The first, larger radiused portion 96 of the aperture 94 has a diameter which is slightly greater than the diameter of the end portion 55 of the fastener member pilot point 54 and smaller than the threaded shank portion 52 of the fastener member 24. The second, smaller radiused portion 98 of the aperture 94 has a diameter which is slightly greater than the diameter of the pilot point retention groove 56 on the fastener member 24 and smaller than the diameter of the end portion 55.

The angled guide portion 92 of the second leg 84 includes an indentation 100 which acts as a guide for engagement with the pilot point 54 of the fastener member 24. The indentation 100 is a curved recess provided along the length of the angled guide portion 92 and aligns with the double radiused aperture 94.

Figure 1:
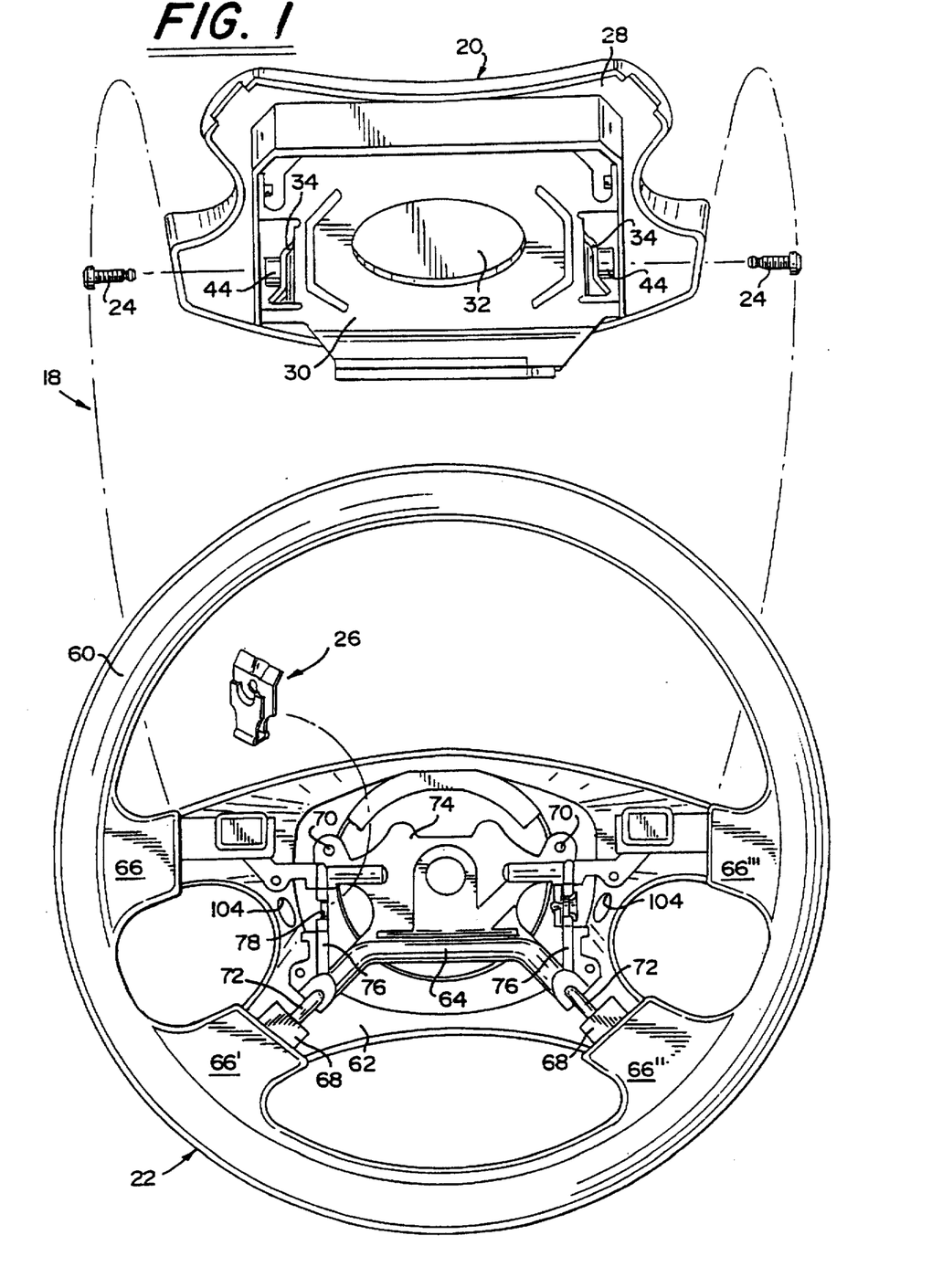
FIG. 1 is an exploded, perspective view of a steering wheel hub and an air bag module which incorporates the features of a first embodiment of the invention.
Figure 2:
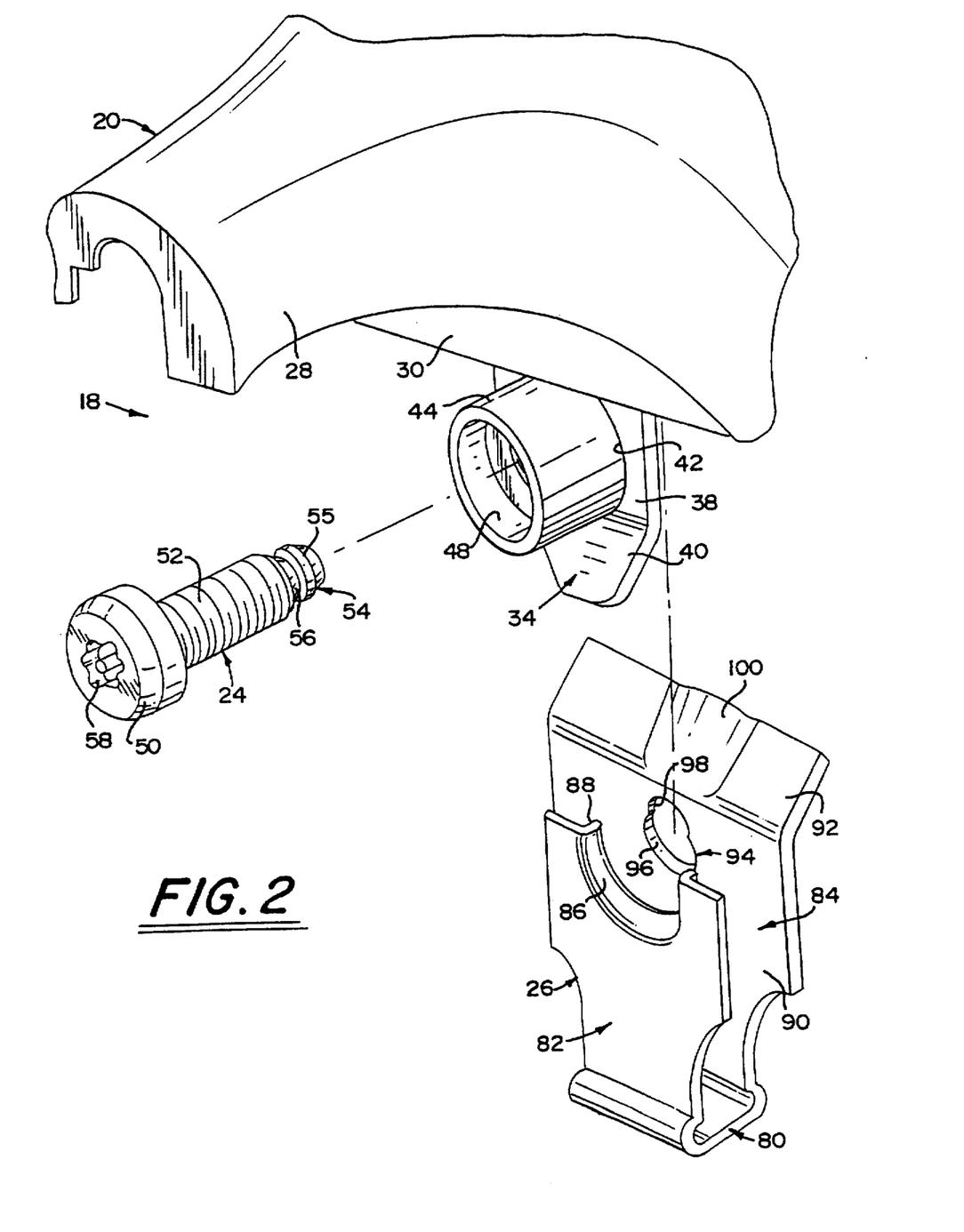
FIG. 2 is an enlarged, exploded, partial perspective view of the air bag module and a clip member which is mounted on the steering wheel hub.
Figure 3:
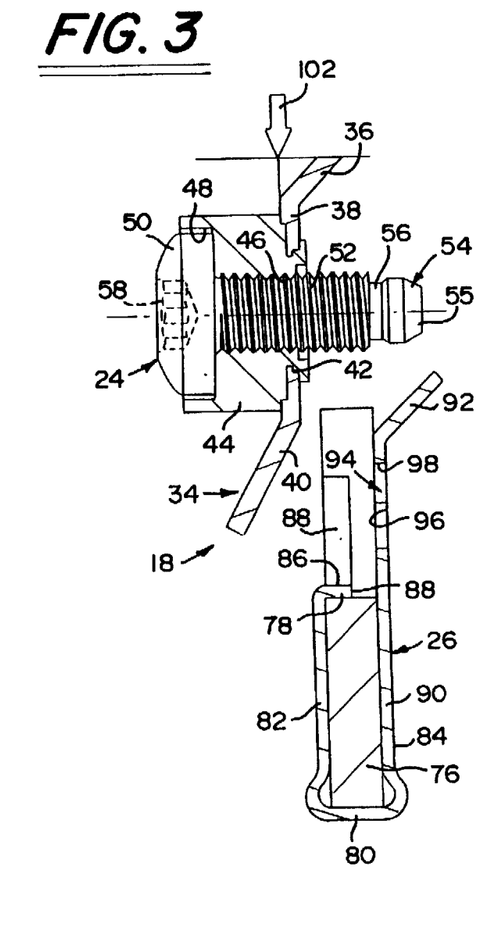
FIGS. 3-7 are cross-sectional views of the components in FIGS. 1 and 2, with the fastener member shown in a side elevational view, illustrating the sequence of operation in joining the air bag module with the steering wheel hub using the novel slide-in and snap-fit assembly of the present invention.

Each of the U-shaped clip members 26 is attached to one of the base side casting portions 76, respectively, as shown in FIG. 1. Each clip member base 80 seats against the bottom of the respective side casting portion 76, each first leg 82 extends upwardly and seats against the outer side of the respective side casting portion 76 and the second leg 84 extends upwardly and sits against the inner side of the respective side casting portion 76, see FIGS. 3–7. The U-shaped retention tab 88 engages against the concave cutout 78 in the respective side casting portion 76 to lock the clip member 26 into place against the respective side casting portion 76. The angled guide portion 92 of each clip member 26 extends toward the center of the steering wheel housing 22.

Normally, the planar portion 90 of the second leg 84 and the planar first leg 82 are disposed parallel to each other. During the assembly of the air bag module 20 with the steering wheel hub 22 in a sliding, snap-fit assembly, as described in detail herein, the second leg 84 is temporarily resiliently biased or deflected outwardly relative to the first leg 82.

The mounting operation of the first embodiment of the system 18 will now be explained with respect to FIGS. 3–7.

To engage the air bag module 20 with the steering wheel hub 22, first, the fastener members 24 are engaged through the respective clinch nut members 44 and pan tabs 34 on the air bag module 20 such that the fastener's end portion 55 extends from the pan tabs 38 toward the center of the air bag module 20 and the annular retention groove 56 extends inwardly of the respective pan tab 34. The head 50 of each fastener member 24 is seated within the counterbore 48 provided in the respective clinch nut members 44. Because the head 50 of the fastener member 24 is seated within the clinch nut counterbore 48 and the head 50 of the fastener member 24 has a tamper resistant multi-lobular recess 58 provided therein, these features provide tamper-resistance to deter the removal of the fastener member 24, other than by a technician or mechanic having an authorized tool.

Thereafter, as indicated in FIG. 1, the air bag module 20 is placed down onto the steering wheel hub 22 so that the pilot points 54 of the fastener members 24 align with the U-shaped clip members 26 on the steering wheel base 64, also see FIGS. 3–7. The air bag module 20 is pushed downward towards the steering wheel hub 22, as indicated by arrow 102 in FIGS. 3–5.

Figure 4:
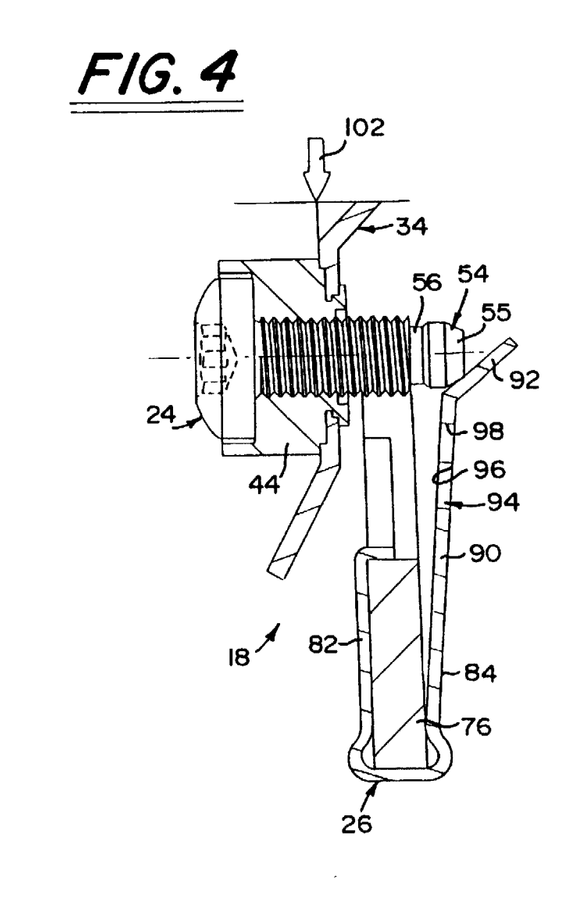

The engagement of one of the fastener members 24 with one of the clip members 26 is shown in FIGS. 3–7. This engagement is described with respect to this one of the fastener members 24 and the clip members 26 with the understanding that the other fastener member 24 is engaged with the other clip member 26 in an identical manner and at the same time. As shown in FIG. 4, the end portion 55 of the pilot point 54 of the fastener member 24 engages the angled guide portion 92 of the second leg 84 and slides along or "rides" in the indentation 100 provided on the angled guide portion 92. This downward movement of the air bag module 20 and the fastener member 24 causes the clip member second leg 84 to be deflected outwardly relative to the base side casting portion 76 and the clip member first leg 82. The maximum deflection of the second leg 84 from the vertical is approximately nine degrees.

Figure 5:
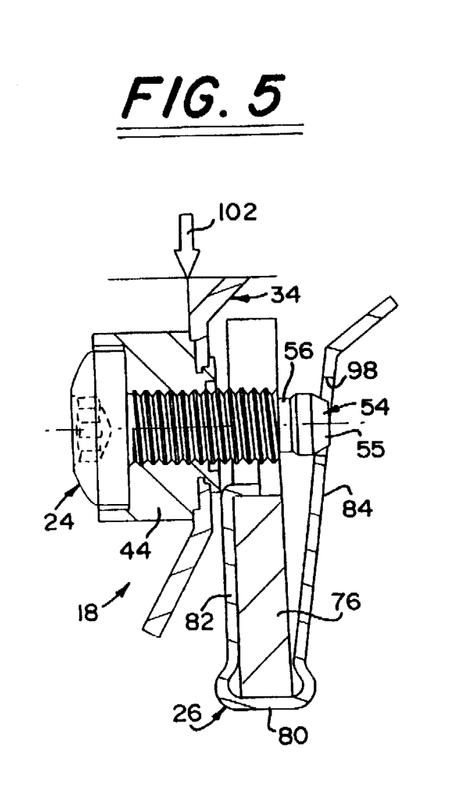
Figure 6:
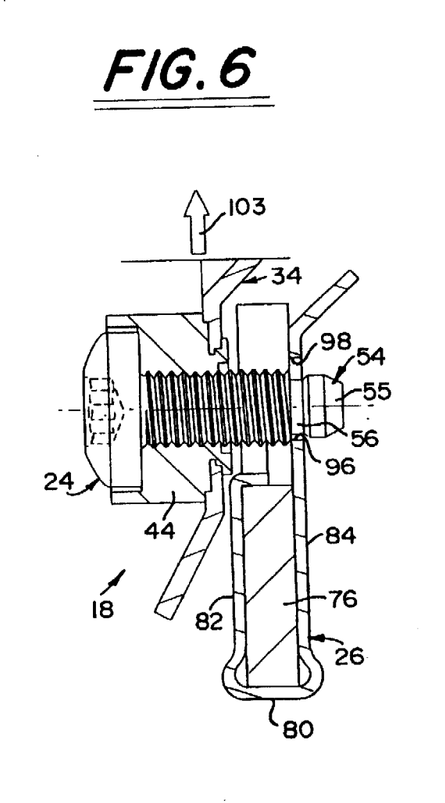

As the air bag module 20 is continued to be pushed downwardly onto the steering wheel hub 22, the air bag module 20 presses against the resilient mounting members 68 provided on the hand grip portion 60 which causes the mounting members 68 to compress. The pilot point 54 of the fastener member 24 continues to slide along the portions 92, 90 of the clip member leg 84 toward the larger portion 96 of the double radiused aperture 94 in the clip member 26. It will be appreciated that the end portion 55 of the pilot point 54 will not enter the smaller radiused portion 98. Once the resilient mounting members 68 compress sufficiently to allow the air bag module 20 to move far enough into the recess provided by the steering wheel housing 62 such that the fastener member 24 aligns with the larger radiused portion 96 of the aperture 94, the end portion 55 of the fastener member pilot point 54 passes through the larger radiused portion 96 of the aperture 94 as shown in FIGS. 5 and 6, and the retention groove 56 sits within the larger radiused portion 98 of the aperture 94. The threaded shank portion 52 of the fastener member 24 does not pass through the larger radiused portion 98 of the aperture 94 because it has a diameter which is greater than the portion 98. As the pilot point 54 of the fastener member 24 enters the larger radiused portion 98 of the aperture 94, the now deflected, second leg 84, because of its resiliency, snaps back into position until it seats against the base side casting portion 76 in an undeflected position to enclose the pilot point 54 of the fastener member 24, thus capturing the air bag module 20 onto the steering wheel hub 22. When the second leg 84 snaps back to seat against the base side casting portion 76, an audible click is heard by the installer to assure the installer that the air bag module 20 is fully installed.

Figure 7:
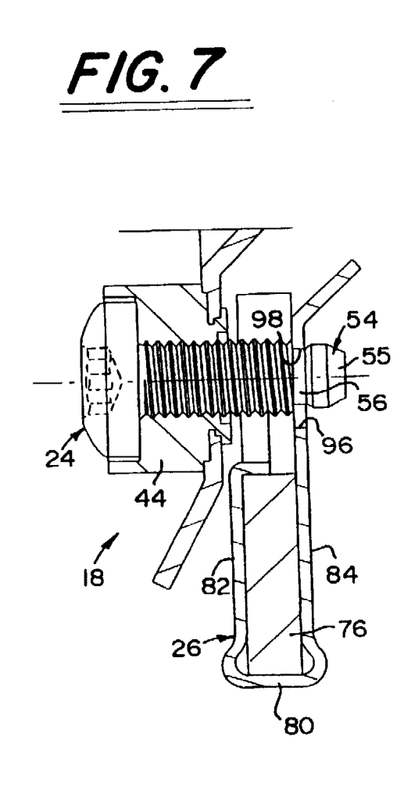

Once the downward force 102 is discontinued, the previously compressed, resilient mounting members 68 on the hand grip portion 60 relax which causes the air bag module 20 to move upwardly slightly relative to the metal base 74, as shown in FIGS. 6 and 7 and indicated by arrow 103 in FIG. 6, thereby causing the fastener member 24 to move upwardly in the double radiused aperture 94 by sliding along the retention groove 56 to secure the air bag module 20 in the assembled condition with the steering wheel hub 22. The retention groove 56 permits the fastener member 24 to move upwardly relative to the clip member 26 because the retention groove 56 has a diameter which is smaller than the diameter of the smaller radiused portion 98. Once fully installed, the retention groove 56 of the fastener member 24 will be disposed in the smaller radiused portion 98 and the pilot point 54 of the fastener member 24 cannot be disengaged through the smaller radiused portion 98 as the end portion 55 has a diameter which is greater than the smaller radiused portion 98. The resilient mounting members 68 do not completely return to their original, completely uncompressed state after downward pressure on the air bag module 20 has been stopped and instead the resilient mounting members 68 are maintained with some compression in order to prevent rattle of the air bag module 20.

To remove the air bag module 20 from the steering wheel hub 22 so that the module 20 can be replaced with a like module or otherwise serviced, a qualified technician uses an authorized tool to remove each fastener member 24 through associated access apertures 104, FIG. 1, provided through the sides of the recessed steering wheel housing 62 adjacent to the U-shaped clip members 26. To remove the fastener members 24, the fastener members 24 are unscrewed with the proper, authorized tools by the technician to cause the fastener members 24 to move through the respective pan tabs 34 and the clinch nut members 44. The bulbous profile of the pilot point end portion 55 causes the pilot point 54 to cam downwardly into the larger radiused aperture 96 when the pilot point 54 comes into contact with the clip member 26 so that the fastener member 24 can be released therefrom as the fastener member 24 is being unscrewed. Once the fastener members 24 are removed from the clinch nut members 44, the air bag module 20 is free to be released from the steering wheel hub 22 by pulling the air bag module 20 away from the steering wheel hub 22. This provides for removal of the air bag module 20 perpendicular to the line of installation of the air bag module 20 with the steering wheel hub 22 to provide for easy and quick disassembly with the proper tools by a qualified technician. The fastener members 24 can then be reassembled with the air bag module pan tabs 34 for reinstallation of the air bag module 20 with the steering wheel hub 22 by a sliding, snap-fit engagement after service or a new, like air bag module can be installed on the steering wheel hub 22.

Attention is now directed to the alternate embodiments shown in FIGS. 3-21. As described herein in the various embodiments, the engagement of the fastener members is described with respect to one of the clip members with the understanding that the other fastener member is engaged with the other clip member in an identical manner and at the same time. Also, it is to be understood that all of the above structure, features and advantages discussed with respect to the first embodiment are applicable to the second through eighth embodiments, except for the differences noted herein.

FIG. 8 shown a second embodiment of the system 18b which provides an alternative design for the pan tabs 34b. These pan tabs 34b provide a lower cost version than that of FIGS. 1-7 wherein a clinch nut member 44 is used. The clinch nut member 44 is replaced by an extrusion 106 on the pan tab 34b which has a threaded aperture 108 therethrough. The threaded shank portion 52b of the fastener member 24b is engaged through the threaded aperture 108 in the extrusion 106 to releasably secure the fastener member 24b with the pan tab 34b.

As shown in the third embodiment of the system 18c illustrated in FIG. 9, if desired, both the pan tab 34c and the second leg 84c of the clip member 26c can flex during assembly, with both components 34c, 84c snapping toward each other once the pilot point end portion 55c of the fastener member 24c has passed through the larger radiused portion 96c of the double radiused aperture 94c.

As shown in the fourth embodiment of the system 18d illustrated in FIG. 10, the fastener member 24d can be placed at an angle other than 90° to the installation plane. By placing the fastener member 24d at an angle relative to the installation plane, this allows for easier access to the fastener member 24d for subsequent disassembly.

Figure 11:
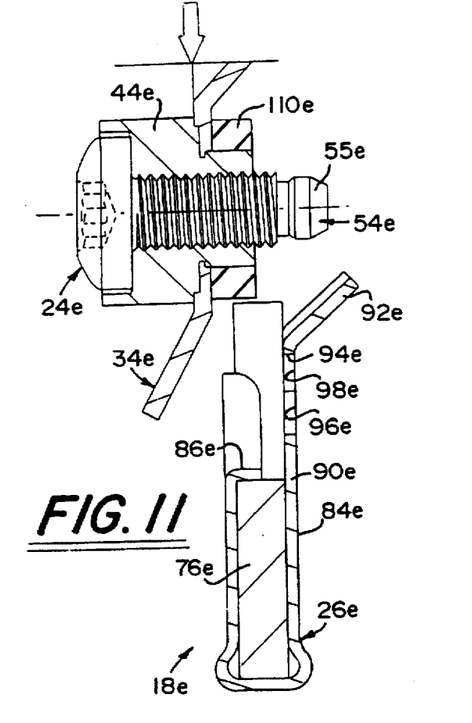
FIGS. 11-14 are a cross-sectional views of the components, with the fastener member shown in a side elevational view, which incorporate the features of a fifth embodiment of the present invention and illustrating the sequence of operation in joining the air bag module with the steering wheel hub using the novel slide-in and snap-fit assembly of the present invention.

Attention is now directed to the fifth and sixth embodiments of the system 18e, 18f, respectively shown in FIGS. 11-14 arid 15. As shown in FIG. 11 of the fifth embodiment and in FIG. 15 of the sixth embodiment, an elastomeric member 110e, 110f is associated with each clinch nut 44e, 44f, respectively. As shown in FIGS. 11-14, the elastomeric member 110e is a ring which encircles the clinch nut 44e proximate to the end portion 55e of the fastener member pilot point 54e. As shown in FIG. 15, the elastomeric member 110f is a U-shaped member which is secured to the U-shaped cutout 86f of the clip member 26f. Of course, the U-shaped elastomeric member 110f can be secured to the underside of the clinch nut 44f.

The method of securing the fastener member 24e, 24f to the clip member 26e, 26f is described with respect to the fifth embodiment with the understanding the method for securing the fastener member 24f of the sixth embodiment is identical. This engagement is described with respect to this one of the fastener members 24e and the clip members 26e with the understanding that the other fastener member 24e is engaged with the other clip member 26e in an identical manner and at the same time.

As shown in FIG. 11, initially, the elastomeric member 110e is not compressed. As the air bag module is brought into engagement with the steering wheel hub, the end portion 55e of the pilot point 54e of the fastener member 24e engages the angled guide portion 92e of the second leg 84e and slides along or "rides" in the indentation provided on the angled guide portion 92e. As in the previous embodiments, this downward movement causes the clip member second leg 84e to be deflected outwardly relative to the base side casting portion 76e and the clip member first leg 82e.

Figure 12:
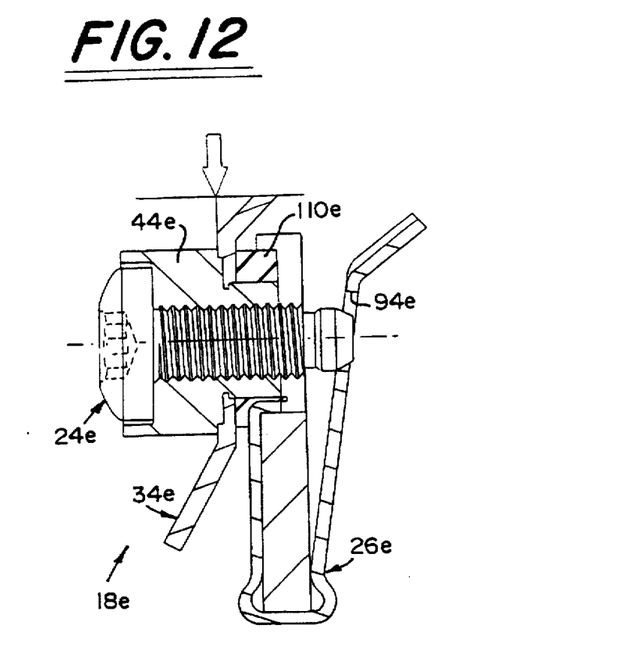
Figure 13:
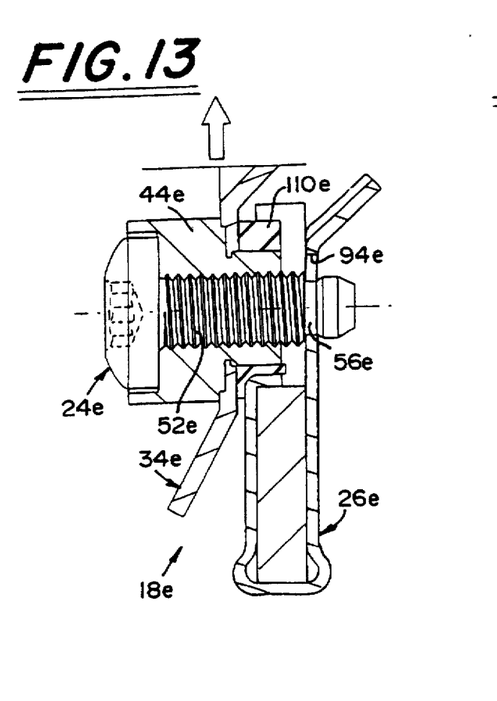

As the air bag module is continued to be pushed downwardly onto the steering wheel hub, the air bag module presses against the resilient mounting members provided on the hand grip portion which causes the mounting members to compress. The pilot point 54e of the fastener member 24e continues to slide along the portions 92e, 90e of the clip member leg 84e toward the larger portion 96e of the double radiused aperture 94e in the clip member 26e. The elastomeric member 110e compresses between the clinch nut 44e and the U-shaped cutout 86e of the clip member 26e as the fastener member 24e is initially engaged with the double radiused aperture 94e in the clip member 26e. Once the fastener member 24e aligns with the larger radiused portion 96e of the aperture 94e, the end portion 55e of the fastener member pilot point 54e passes through the larger radiused portion 96e of the aperture 94e as shown in FIGS. 12 and 13, and the retention groove 56e sits within the larger radiused portion 98e of the aperture 94e. As the pilot point 54e of the fastener member 24e enters the larger radiused portion 98e of the aperture 94e, the now deflected, second leg 84e, because of its resiliency, snaps back into position, as occurs in the first embodiment, until it seats against the base side casting portion 76e in an undeflected position to enclose the pilot point 54e of the fastener member 24e, thus capturing the air bag module onto the steering wheel hub. The elastomeric member 110e remains in a compressed state up to this point.

Figure 14:
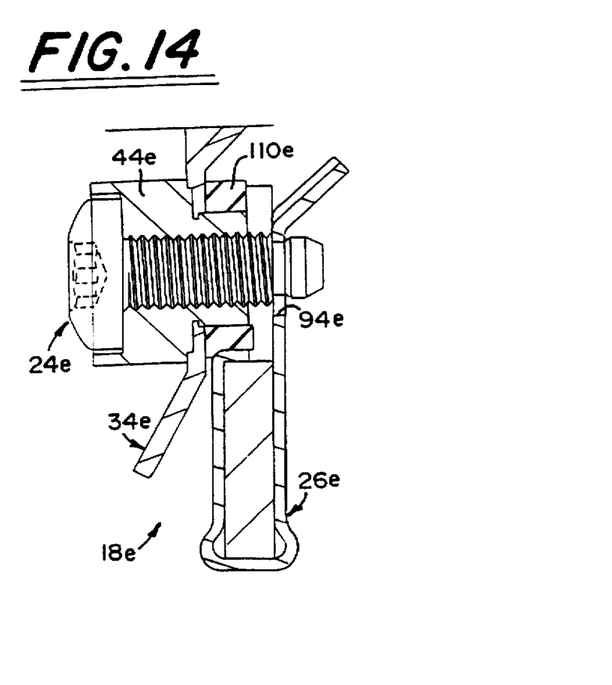

Once the downward force 102 is discontinued, the previously compressed, resilient mounting members on the hand grip portion relax which causes the air bag module to move upwardly slightly relative to the metal base, thereby causing the fastener member 24e to move upwardly in the double radiused aperture 94e by sliding along the retention groove 56e to secure the air bag module in the assembled condition with the steering wheel hub, as shown in FIG. 14. The elastomeric member 110e also expands, but does not completely return to the original, completely uncompressed state, and instead is maintained with some compression in order to prevent rattle of the air bag module. Once fully installed, the retention groove 56e of the fastener member 24e will be disposed in the smaller radiused portion 98e and the pilot point 54e of the fastener member 24e cannot be disengaged through the smaller radiused portion 98e. As in the first embodiment, the resilient mounting members do not completely return to their original, completely uncompressed state after downward pressure on the air bag module has been stopped and instead the resilient mounting members are maintained with some compression in order to also prevent rattle of the air bag module.

As shown in the seventh embodiment of the system 18g illustrated in FIGS. 16–18, the separate clip members 26, 26b, 26c, 2d, 26e, 26f have been eliminated and replaced by a holding member which is formed from an extension 112 provided on the steering wheel casting 76g. The indentation 100 g is provided on an angled end surface of the extension 112 and the double radiused aperture 94g is provided through the extension 112 a predetermined distance away from the angled end surface of the extension 112. The extension 112 and the casting 76g do not flex as shown in this embodiment, although it is envisioned that the extension 112 and casting 76g can flex and snap back into place.

As shown in FIGS. 17, as the pilot point 54g of the fastener member 24g contacts the indentation 100g provided on the end of the extension 112, the pan tab 34g to which the fastener member 24g is mounted flexes outwardly from the extension 112 and from the center of the air bag module so as to allow the pilot point 54g of the fastener member 24g to slide along the indentation 100g and engage the double radiused aperture 96g. As the pilot point 54g of the fastener member 24g passes through the larger radiused portion 96g of the aperture 94g, the pan tab 34g flexes inwardly to snap the air bag module into place. Thereafter, as shown in FIG. 18, the pilot point 54g moves upwardly into the smaller portion 98g of the aperture 94g when the resilient mounting members provided on the steering wheel hub relax after downward pressure has stopped, and is held therein in an identical manner to that provided in the previous embodiments.

As shown in the eighth embodiment of the system 18h illustrated in FIGS. 19–21, the separate clip members 26, 26b, 26c, 26d, 26e, 26f and the clinch nuts 44, 44c, 44d, 44e, 44f, 44g have been eliminated. The fastener member 24h is placed in an extension 114 provided on the steering wheel casting 76h instead of on the air bag module. The extension 114 has a threaded aperture 116 through which the fastener member 24h is engaged. The head 50h of the fastener member 24h sits within a counterbore 118 provided at the end of the aperture 116. Because the head 50h of the fastener member 24h is seated within the counterbore 118 and the head 50h of the fastener member 24h has a tamper resistant multi-lobular recess 58h provided therein, these features provide tamper-resistance to deter the removal of the fastener member 24h, other than by a technician or mechanic having an authorized tool.

The pair of pan tabs 34h, each of which provides one of the holding members and only one of which is shown, provided on the air bag module has a first portion 36h which is angled relative to the air bag module plate, a second portion 38h which is generally perpendicular relative to the air bag module plate and angled relative to the first portion 36h, and a third portion 40h which is angled relative to the second portion 38h. The first and third portions 36h, 40h are angled inwardly toward the center of the air bag module. The third portion 40h of the pan tab 34h has the indentation 100h provided thereon, such indentation 100h being identical in function to that of the previous embodiments.

The second portion 38h of each pan tab 34h has the double radiused aperture 94h therethrough so that the fastener member 24h can be engaged therewith as described herein. The double radiused aperture 94h in this embodiment is reversed from the previous embodiments. That is, the first, larger radiused portion 96h of the aperture 94h is provided above the second, smaller radiused portion 98h, whereas in the previous embodiments, the first, larger radiused portion of the aperture is provided below the second, smaller radiused portion. Thus, the first portion 96h of the aperture 94h is closer to the first portion 36h than the second portion 98h of the aperture 94h. Other than being reversed, the structure of the double radiused aperture 94h is identical in structure to that of the previous embodiments.

As shown in FIG. 20, the pan tab 34h is flexible so that it can flex inwardly towards the center of the air bag module to allow the pilot point 54h of the fastener member 24h to slide along the indentation 100h and engage the double radiused aperture 94h when downward force is applied to the air bag module. As the pilot point 54h of the fastener member 24h passes through the larger radiused portion 96h of the aperture 94h, the pan tab 34h flexes outwardly until it contacts the extension 118 to snap the air bag module into place. The extension 114 and the casting 76h do not flex as shown in this embodiment, although it is envisioned that the extension 114 and casting 76h can flex and snap back into place.

Once the downward force is discontinued, the previously compressed, resilient mounting members on the hand grip portion relax which causes the air bag module to move upwardly slightly relative to the metal base, thereby causing the fastener member 24h to move downwardly in the double radiused aperture 94h by sliding along the retention groove 56h to secure the air bag module in the assembled condition with the steering wheel hub as shown in FIG. 21. Once fully installed, the retention groove 56h of the fastener member 24h will be disposed in the smaller radiused portion 98h and the pilot point 54h of the fastener member 24h cannot be disengaged through the smaller radiused portion 98h as the end portion 55h has a diameter which is greater than the smaller radiused portion 98h.

Of course, in each of the second through eighth embodiments of the system 18b–18h, the air bag module can be removed from the steering wheel casting in a manner like that described with respect to the first embodiment. In the eighth embodiment, of course, the bulbous end 55h of the pilot point 54h will cause the pilot point 54h of the fastener member 24h to cam upwardly into the larger radiused portion 96h of the aperture 94h in order to release the fastener member 24h therefrom.

The system 18a–18h disclosed in the present invention provides several advantages. A low insertion force is required to secure the air bag module 20 to the steering wheel hub 22. The multi-lobular recess 58 and the counterbore 48 in the clinch nut member 44 provide tamper resistance when the air bag module 20 is installed with the steering wheel hub 22. Structural strength is also provided by this assembly. An audible click assures the installer that the air bag module 20 is fully installed with the steering wheel hub 22. Furthermore, the system of the present invention is removed from the sides of the steering wheel hub 22 which provides a more ergonomical design. Moreover, the air bag module 20 can be easily and quickly disassembled from engagement with the steering wheel hub 22 by a qualified technician with an authorized tool for service or replacement.

While preferred embodiments of the present invention are shown and described, it is envisioned that those skilled in the art may devise various modifications of the present invention without departing from the spirit and scope of the appended claims. For example, in the illustrated embodiment, the fastener members are carried by the air bag module, while the resilient clip members are carried by the steering wheel hub. It is anticipated that their arrangement could be reversed. Also, the resilient mounting members are carried by the steering wheel hub. Instead, these resilient mounting members could be provided on the air bag module.

The invention claimed is:

1. A system for a sliding, snap-fit engagement of a pair of components together, said components comprising an air bag module and a steering wheel hub, said system comprising:

said components;

at least one fastener member attached to one of said components and having an end portion, a retention groove and a threaded shank portion, said end portion having a diameter which is greater than a diameter of said retention groove; and at least one holding member mounted on the other of said components and having a portion which can be selectively deflected and a double-radiused aperture therein for engaging an associated fastener member when said air bag module is engaged with said steering wheel hub, said double radiused aperture having a portion being of a smaller radius and a portion being of a larger radius, said end portion of said associated fastener member respectively passing through said larger radiused portion of said aperture and said associated fastener member moving into said smaller radiused portion by sliding along said retention groove to respectively secure said fastener member to the holding member.

2. A system as defined in claim 1, wherein a pair of said holding members are provided on opposite sides of the component to which said holding members are attached and a pair of said fastener members are provided for respectively engaging said holding members.

3. A system as defined in claim 1, wherein each said holding member comprises a clip member.

4. A system as defined in claim 3, wherein each said clip member is generally U-shaped.

5. A system as defined in claim 4, wherein said at least one U-shaped clip member includes first and second legs depending from a base, said second leg being resiliently deflectable to permit engagement of the associated fastener member with said clip member.

6. A system as defined in claim 5, wherein said second resiliently deflectable leg has an indentation groove thereon for engagement with said fastener member to guide said fastener member into said double radiused aperture.

7. A system as defined in claim 5, wherein said first leg has a retention tab thereon for engagement with said component to which said clip member is attached to secure said clip member thereto.

8. A system as defined in claim 1, wherein said at least one fastener member includes means for preventing tampering with said at least one fastener member.

9. A system as defined in claim 1, wherein means for engaging said at least one fastener member is provided on said component to which said fastener member is attached, said at least one fastener member being releasable from engagement therewith.

10. A system as defined in claim 9, wherein said engaging means comprises nut means attached to said component to which said fastener member is attached, said at least one fastener member being removably engaged with said nut means.

11. A system as defined in claim 10, wherein said nut means comprises a nut having a counterbore in which a head of said fastener member is seated to prevent tampering with said fastener member.

12. A system as defined in claim 9, wherein said engaging means comprises a tab on said component to which said fastener member is attached, said tab having an extruded aperture therein to which said fastener member is removably engaged.

13. A system as defined in claim 9, wherein both of said portion on said holding member and said means for engaging said at least one fastener member can be deflected during engagement of each said fastener member with said holding member.

14. A system as defined in claim 1, wherein each said fastener member can be installed with each said holding member at an angle from the horizontal.

15. A system as defined in claim 1, further including an elastomeric member mounted between each said fastener member and said holding member, each said elastomeric member being compressed during installation of each said fastener member with said respective holding member, each said elastomeric member being maintained with some compression after installation of each said fastener member with said respective holding member.

16. A system as defined in claim 1, wherein each said holding member comprises an extension provided on said component.

17. A system as defined in claim 16, wherein said extension has an indentation groove thereon for engagement with said associated fastener member to guide said associated fastener member into said double radiused aperture.

18. A system as defined in claim 1, wherein each said holding member is a pan tab mounted on said air bag module.

19. A system as defined in claim 1, wherein said steering wheel hub has means for allowing access to said fastener member so that said at least one fastener member can be released from engagement with said air bag module and said holding member.

20. A system as defined in claim 1, further including resilient mounting members provided on one of said components for engagement with the other of said components, said resilient mounting members compressing during attachment of said air bag module to said steering wheel hub and relaxing after said at least one fastener member is engaged with said associated holding member to move said fastener member into said smaller radiused portion of said aperture in said associated holding member to secure the engagement of said fastener member to said associated holding member.

21. A system for a sliding, snap-fit engagement of a pair of components together, said components comprising an air bag module and a steering wheel hub, said system comprising:

said components;

at least one fastener member attached to one of said components and having a pilot end portion;

at least one holding member provided on the other of said components and having a portion which can be deflected relative to said component to which said holding member is mounted and a double-radiused aperture therein for engaging an associated fastener member when said air bag module is engaged with said steering wheel hub, said double radiused aperture having a smaller radiused portion and a larger radiused portion; and resilient mounting members provided on one of said components for engagement with the other of said components, said resilient mounting members compressing during attachment of said air bag module to said steering wheel hub and relaxing after said at least one fastener member is engaged with said associated holding member to move the pilot end portion of said fastener member from said larger radiused portion of said aperture into said smaller radiused portion of said aperture in said associated holding member to secure the engagement of said fastener member to said associated holding member.

22. A system as defined in claim 21, wherein each said holding member comprises a clip member.

23. A system as defined in claim 21, wherein each said clip member is U-shaped and includes first and second legs depending from a base, said second leg being resiliently deflectable to permit engagement of the fastener member with said clip member.

24. A system as defined in claim 23, wherein said second resiliently deflectable leg has an indentation groove thereon for engagement with said fastener member to guide said fastener member into said double radiused aperture.

25. A system as defined in claim 21, wherein means for engaging said fastener member is provided on said component to which said fastener member is attached, said fastener member being releasable from engagement therewith.

26. A system as defined in claim 25, wherein said engaging means comprises nut means attached to said component to which said fastener member is attached, said at least one fastener member being removably engaged with said nut means, said nut means having a counterbore in which a head of said fastener member is seated to prevent tampering with said fastener member.

27. A system as defined in claim 25, wherein said engaging means comprises a tab on said component to which said fastener member is attached, said tab having an extruded aperture therein to which said fastener member is removably engaged.

28. A system as defined in claim 25, wherein both of said portion on said holding member and said means for engaging said at least one fastener member can be deflected during engagement of each said fastener member with said holding member.

29. A system as defined in claim 21, further including an elastomeric member mounted between each said fastener member and said holding member, each said elastomeric member being compressed during installation of each said fastener member with said respective holding member, each said elastomeric member being maintained with some compression after installation of each said fastener member with said respective holding member.

30. A system as defined in claim 21, wherein each said holding member comprises an extension provided on said component.

31. A system as defined in claim 30, wherein said extension has an indentation groove thereon for engagement with said fastener member to guide said fastener member into said double radiused aperture.

32. A system as defined in claim 21, wherein each said holding member is a pan tab mounted on said air bag module.

33. A method of providing a system for a sliding, snap-fit engagement of a pair of components together comprising the steps of:

providing said pair of components, said components comprising an air bag module and a steering wheel hub;

providing at least one fastener member attached to one of said components, said at least one fastener member including a pilot end portion;

providing at least one holding member on the other of said components, said at least one holding member having a portion which can be deflected and a double-radiused aperture therein, said double radiused aperture having a smaller radiused portion and a larger radiused portion;

providing resilient mounting members on one of said components;

applying force to said air bag module to cause said air bag module to move laterally of said steering wheel hub to bring the pilot end portion of said at least one fastener members into engagement with an associated holding member;

continuing the application of force and said lateral movement to compress said resilient mounting members and to deflect the resilient portion of said associated holding member, until each said pilot end portion is aligned with each said larger radiused portion whereupon said pilot end portion will enter said larger radiused portion and said resilient portion of the associated holding member will snap back to its undeflected position with said pilot end portion disposed in said larger radiused portion;

discontinuing the application of said lateral force to permit said resilient mounting members to relax thereby moving said air bag module in an opposite direction to said steering wheel hub and disposing said pilot end portion in said smaller radiused portion to maintain said air bag module and said steering wheel hub in assembly.

* * * * *